(12) United States Patent
Mohrlock et al.

(10) Patent No.: US 10,896,414 B2
(45) Date of Patent: Jan. 19, 2021

(54) COMPUTER MESSAGE ROUTING AND PROCESSING SYSTEM AND METHOD

(71) Applicant: MASTERCARD INTERNATIONAL INCORPORATED, Purchase, NY (US)

(72) Inventors: Sharon Mohrlock, St. Charles, MO (US); Winifred Elizabeth House, Troy, MO (US); Carol A. Jonak, Kirkwood, MO (US); Suman Rausaria, Ballwin, MO (US); Mike Rethorn, Wildwood, MO (US); Aimee Musil, O'Fallon, MO (US); Jill E. Chong, Ballwin, MO (US); Maria Rice, Davie, FL (US); Anushree Ashutosh Prabhune, Stamford (GB); Richard Lower, Udon Thani (TH)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/888,211

(22) Filed: May 29, 2020

(65) Prior Publication Data

US 2020/0294012 A1    Sep. 17, 2020

Related U.S. Application Data

(63) Continuation of application No. 15/341,836, filed on Nov. 2, 2016, now Pat. No. 10,671,983.

(51) Int. Cl.
*G06Q 40/00* (2012.01)
*G06Q 20/10* (2012.01)
(Continued)

(52) U.S. Cl.
CPC .......... *G06Q 20/108* (2013.01); *G06Q 20/08* (2013.01); *G06Q 20/38* (2013.01); *H04L 45/745* (2013.01)

(58) Field of Classification Search
USPC ........................................ 705/44, 42, 39, 38
See application file for complete search history.

(56) References Cited

U.S. PATENT DOCUMENTS 6,807,410 B1 * 10/2004 Pailles ................... G06Q 20/02
455/407
6,973,818 B2   12/2005 Silvis et al.
(Continued)

FOREIGN PATENT DOCUMENTS

WO   2013185220 A1   12/2013

OTHER PUBLICATIONS

Hop integrity in computer networks; Proceedings 2000 International Conference on Network Protocols (pp. 3-11); Jan. 1, 2000; Gouda, M.G. Elnozahy, E.N. Huang, C.-T. (Year: 2005).*
(Continued)

*Primary Examiner* — Tien C Nguyen
(74) *Attorney, Agent, or Firm* — Armstrong Teasdale LLP

(57) ABSTRACT

A message routing and processing computing device and associated methods for routing and processing computer messages are disclosed. The message routing and processing computing device stores payment account identifiers and associated message routing instructions and is configured to receive a computer message including a payment account identifier. Based, at least in part, on the payment account identifier, the message routing and processing computing device determines a message route for the message and routes the message accordingly.

20 Claims, 7 Drawing Sheets

(51) Int. Cl.
  *G06Q 20/38* (2012.01)
  *G06Q 20/08* (2012.01)
  *H04L 12/741* (2013.01)

(56) References Cited

U.S. PATENT DOCUMENTS

| | | | |
|---|---|---|---|
| 7,853,782 B1* | 12/2010 | Geddes | H04L 63/029 |
| | | | 713/151 |
| 8,256,666 B2 | 9/2012 | Dixon et al. | |
| 8,732,080 B2 | 5/2014 | Karim | |
| 8,781,923 B2* | 7/2014 | Pitroda | G06Q 20/3227 |
| | | | 705/30 |
| 8,973,818 B2 | 3/2015 | Dixon et al. | |
| 9,123,054 B1 | 9/2015 | Villars et al. | |
| 9,256,875 B2 | 2/2016 | Dixon et al. | |
| 2001/0037264 A1* | 11/2001 | Husemann | G06Q 30/0635 |
| | | | 705/26.81 |
| 2004/0019564 A1* | 1/2004 | Goldthwaite | G06Q 20/12 |
| | | | 705/44 |
| 2005/0055316 A1 | 3/2005 | Williams et al. | |
| 2007/0198432 A1* | 8/2007 | Pitroda | G06F 21/606 |
| | | | 705/64 |
| 2008/0059375 A1* | 3/2008 | Abifaker | G06Q 20/322 |
| | | | 705/44 |
| 2008/0208693 A1 | 8/2008 | Milstein et al. | |
| 2013/0218769 A1 | 8/2013 | Pourfallah et al. | |
| 2013/0226799 A1 | 8/2013 | Raj et al. | |
| 2013/0282464 A1 | 10/2013 | Bradley et al. | |
| 2013/0282468 A1 | 10/2013 | Michael | |
| 2016/0019535 A1 | 1/2016 | Villars et al. | |

OTHER PUBLICATIONS

Shoniregun et al, Securing mobile product ecology for mobile commerce (mC), 2005 IEEE International Conference on Services Computing (SCC'05) vol. 1 (vol. 2, pp. 211-216 vol. 2), Jan. 1, 2005. (Year: 2005).

PCT International Search Report and Written Opinion, Application No. PCT/US2017/058422, dated Dec. 13, 2017, 14 pps.

"ISO 8583", Wikipedia, Oct. 3, 2016, Retrieved from the Internet: URL:https:/len.wikipedia.org/w/index.php?itle=IS0_8583&oldid=742405001 [retrieved on Dec. 5, 20017]. 18 pps.

"RFC 905 ISO Transport Protocol Specification ISO DP 8073", Apr. 1, 1984, Retrieved from the Internet: URL:https://tools.ietf.org/html/rfc905 [retrieved on Dec. 5, 2017]. 164 pps.

* cited by examiner

COMPUTER MESSAGE ROUTING AND PROCESSING SYSTEM AND METHOD

CROSS REFERENCE TO RELATED APPLICATIONS

This application is a continuation application of U.S. patent application Ser. No. 15/341,836, filed Nov. 2, 2016, entitled "COMPUTER MESSAGE ROUTING AND PROCESSING SYSTEM AND METHOD", the disclosure of which is hereby incorporated by reference in its entirety.

BACKGROUND

The present application relates generally to routing and processing of computer messages and, more specifically, routing and processing of computer messages within a payment processing network.

Payment card numbers include information that enable processing of payment card transactions. In known systems, payment card numbers generally consist of at least two distinct number groups. A first group of numbers corresponds to a Banking Identification Number (BIN). The BIN is a fixed-length (typically six-digit) identifier associated with an issuing bank and particular payment card product offered by the issuing bank. An issuing bank may offer one or more payment card products, and, as a result, may be assigned one or more BINs. Specific ranges of BINs are reserved for payment processors to assign to their associated issuing banks. Accordingly, based on a BIN, one can generally determine the payment processor, the issuing bank for the payment card, and the particular payment card product associated with the payment card.

Known payment processing systems use the BIN to route transactions across payment networks. Specifically, when a cardholder initiates a payment card purchase with a merchant, the transaction data is often times first sent to an acquiring bank associated with the merchant. The routing system of the acquiring bank analyzes the BIN to determine which payment processor the transaction data is to be routed for authorization and routes the transaction data accordingly.

Payment card numbers in known systems also generally include a second group of numbers that is an identifier known as a Primary Account Number (PAN). PANs are uniquely associated with individual payment cards. Accordingly, once a transaction has been routed to the proper payment processor and/or issuing bank based on the BIN, known systems use the PAN to look up cardholder information to authorize and otherwise process the transaction.

The known BIN-based approach to routing messages presents a wide range of inefficiencies and problems. First, there are only a finite and relatively small number of BINs available. Although the range of BINs may be expanded by adding additional digits to the BIN, doing so would be extremely costly for the payment card industry. For example, acquiring banks and merchants generally rely on basic rules to determine how to route a given transaction. In many cases, the merchant or acquiring bank may look to see if the BIN falls within a range associated with a particular payment processor, and, if so, routes the transaction data accordingly. In known systems, such routing rules are programmed or hard-wired into payment processing equipment operated by the merchant and acquiring banks. As a result, expanding the number of digits for BINs would require reprogramming of these rules across the payment card industry and, particularly in instances where the rules are hard-coded, may require replacement of payment card processing equipment.

BIN-based routing is also very inefficient in that the full range of PANs associated with a given BIN is generally underused. As previously noted, a BIN corresponds to a specific payment card product while a PAN indicates a specific account associated with a cardholder. Assuming, for example, that a card number consists of 16 digits including six BIN digits and ten PAN digits, approximately ten million PANs may be associated with each BIN. To the extent fewer than ten million cardholders for a particular payment card product exist, the remainder of the available PANs go unused and, as a result, eliminate ranges of available card numbers.

BIN-based routing also presents significant downsides for acquiring banks as it increases the complexity of the acquiring bank's information infrastructure. If an acquiring bank routes transaction data associated with more than one payment processor, for example, the acquiring bank must maintain connections to each payment processor. Maintaining this infrastructure may be costly and may preclude acquiring banks from seeking to partner with additional payment processors. Moreover, the costs for equipment and maintenance in known systems may be cost-prohibitive to institutions seeking to enter the acquiring bank market.

BIN-based routing also increases network traffic. In known systems, acquiring banks must frequently download complete BIN lists and update their routing schemes accordingly. The process of downloading complete BIN lists can lead to heavy network traffic and may be costly to acquiring banks in terms of both the bandwidth required to retrieve the BIN lists and the ancillary negative impacts on the speed of other data transmissions performed during the download of the BIN list.

From a cardholder perspective, BIN-based routing results in a significant inconvenience for any cardholder attempting to change payment card products. Any time a cardholder changes from a first payment card product to a second payment card product, the cardholder must be issued a new payment card number because BINs are assigned at a payment-card-product level. Notably, a new card is generally required even if the second payment card product is offered by the same issuing bank as the first payment card product. Whenever a cardholder is issued a new payment card number the cardholder must update any instances in which the cardholder's payment card information is stored. Given the widespread use and storage of payment card information for online payments, recurring payments, automatic bill payments, and the like, changing one's payment card number can be a daunting task fraught with the risk of missing and failing to update one or more instances of stored payment card information. Notably, failing to properly update payment card information can cause a payment card transaction to be declined, potentially leading to additional fees for the cardholder and negative impacts on the cardholder's credit history. Given this inconvenience and risk, cardholders are generally apprehensive about changing payment card products even if their current payment card product may not be the best fit for their needs.

Issuing banks are also negatively impacted by BIN-based routing. If an issuing bank is dissatisfied with their current payment processor or is offered a more favorable partnership with a new payment processor, for example, the issuing bank may require significant and costly overhaul of their existing transaction processing systems to account for BINs of the new payment processor. These costs may dissuade an issuing bank from switching payment processors despite the new payment processor presenting a more favorable partnership.

Known BIN-based systems also limit the ability of issuing banks to offer new payment card products. When offering a new payment card product, issuing banks are generally required to acquire rights to an unused BIN. However, acquiring such rights may be cost-prohibitive due to the inherent scarcity of BINs. Specifically, the total number of available BINs is limited in two ways. First, the number of digits available for use as BINs caps the total number of available BINs. Second, the number of available BINs for an issuing bank is further limited because payment processors are assigned only specific ranges of BINs. As a result, whether a BIN is available for an issuing bank to acquire depends on both the overall availability of unused BINs and whether the issuing bank's payment processor has exhausted its assigned range of BINs. In light of these limitations, the cost to acquire rights to unused BINs may be sufficiently high to dissuade issuing banks from offering new payment card products to their customers.

In light of the above, a new system and method for routing computer messages in a payment processing network is needed that resolves the inefficiencies and negative implications of a BIN-based system.

BRIEF DESCRIPTION OF THE DISCLOSURE

In one aspect, a message routing and processing computing device is provided. The message routing and processing (MRP) computing device includes one or more processors in communication with one or more memory devices, the message routing and processing computing device configured to: store, within the one or more memory devices, a plurality of payment account identifiers, each payment account identifier identifying a payment account associated with a cardholder of an issuer bank; store, within the one or more memory devices, message routing instructions associated with each of the plurality of payment account identifiers; receive, by the MRP computing device, a computer message corresponding to a payment transaction initiated by a first cardholder, the computer message including a first payment account identifier of the plurality of payment account identifiers; perform, by the MRP computing device, a message routing lookup within the one or more memory devices using the first payment account identifier; retrieve, from the one or more memory devices, the message routing instructions associated with the first payment account identifier; and route the received computer message corresponding to the payment transaction in accordance with the retrieved message routing instructions.

In another aspect, a computer-implemented method for routing and processing computer messages is provided. The method is implemented by a MRP computing device and includes: storing, within the one or more memory devices, a plurality of payment account identifiers, each payment account identifier identifying a payment account associated with a cardholder of an issuer bank; storing, within the one or more memory devices, message routing instructions associated with each of the plurality of payment account identifiers; receiving, by the MRP computing device, a computer message corresponding to a payment transaction initiated by a first cardholder, the computer message including a first payment account identifier of the plurality of payment account identifiers; performing, by the MRP computing device, a message routing lookup within the one or more memory devices using the first payment account identifier; retrieving, from the one or more memory devices, the message routing instructions associated with the first payment account identifier; and routing the received computer message corresponding to the payment transaction in accordance with the retrieved message routing instructions.

In another aspect, a non-transitory computer-readable storage media having computer-executable instructions embodied thereon is provided. When executed by at least one processor, the computer-executable instructions cause the at least one processor to: store, within the one or more memory devices, a plurality of payment account identifiers, each payment account identifier identifying a payment account associated with a cardholder of an issuer bank; store, within the one or more memory devices, message routing instructions associated with each of the plurality of payment account identifiers; receive, by a message routing and processing (MRP) computing device, a computer message corresponding to a payment transaction initiated by a first cardholder, the computer message including a first payment account identifier of the plurality of payment account identifiers; perform, by the MRP computing device, a message routing lookup within the one or more memory devices using the first payment account identifier; retrieve, from the one or more memory devices, the message routing instructions associated with the first payment account identifier; and route the received computer message corresponding to the payment transaction in accordance with the retrieved message routing instructions.

DETAILED DESCRIPTION OF THE DISCLOSURE

Figure 1:
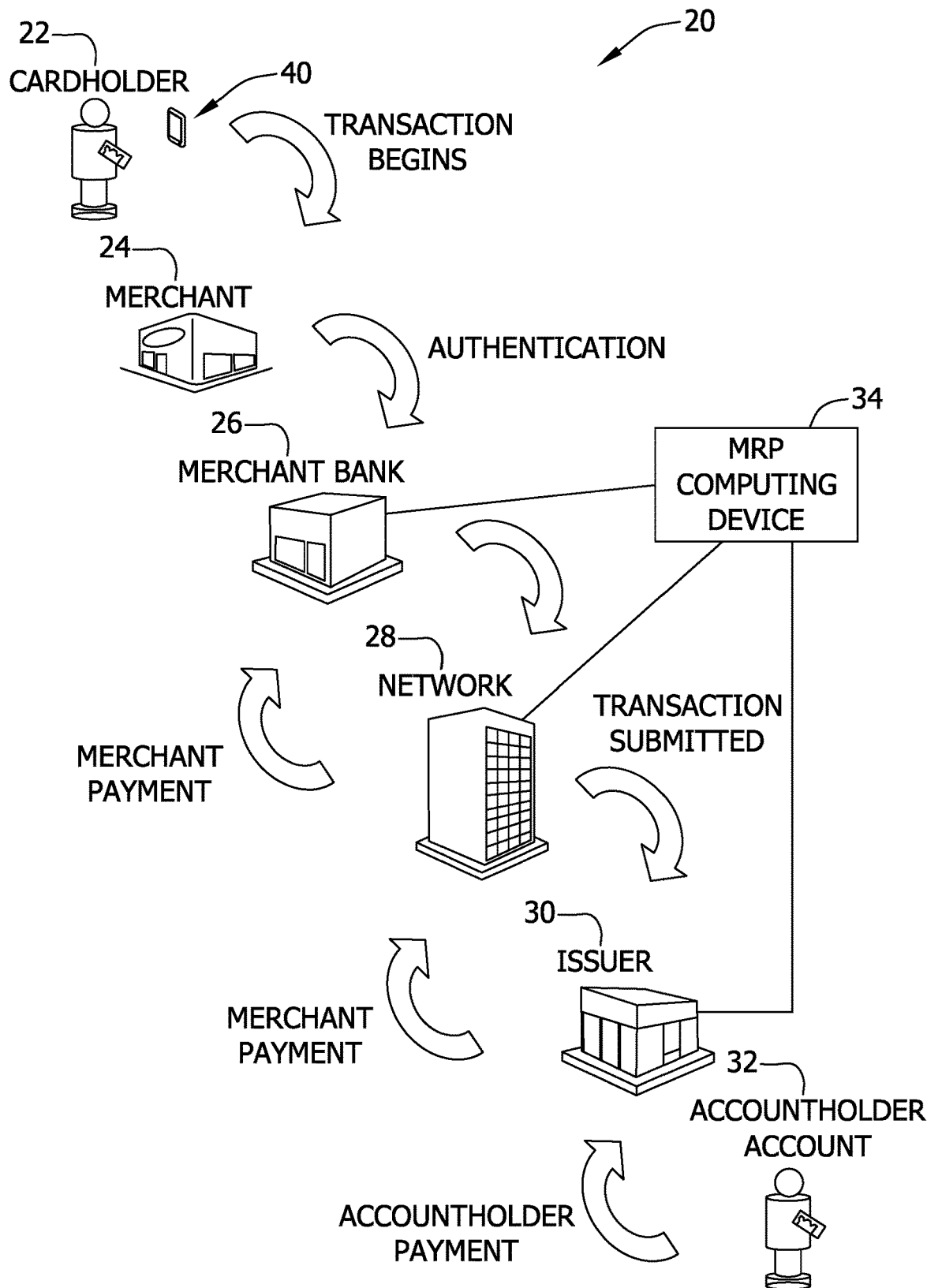
FIG. 1 is a schematic diagram illustrating an example of a multi-party payment processing system with a message routing and processing computing device for processing payment card transactions.

The computer message routing and processing system and method described herein resolves many of the issues and inefficiencies associated with BIN-based routing. The disclosed systems and methods may be used to route any type of computer message including but not limited to computer messages including transaction data. A message routing and processing (MRP) computing device is disclosed that routes computer messages based on a payment account identifier as opposed to a BIN. Instead of an acquiring bank extracting a BIN and deciding where to route a computer message based on the extracted BIN, the computer message is passed in its entirety to the MRP computing device. The MRP computing device then performs a lookup in a routing table or applies routing rules to determine how to route the computer message and routes the message accordingly.

The MRP computing device resolves many of the issues with known BIN-based routing systems. First, the limitations on numbering and underutilization of payment card number ranges are eliminated because the payment account identifier need not be tied to a particular numerical range or format. Second, acquiring banks need only forward computer messages to the MRP computing device and are no longer required to extract routing data or otherwise determine to which payment processor a particular computer message must be routed. The need to download a daily BIN list is also eliminated because the acquirer (which may be an acquiring bank, a merchant acquirer, or a third-party responsible for handling payment card transactions on behalf of a merchant) takes no role in routing computer messages beyond sending the computer messages to the MRP computing device. Third, cardholders may freely change their payment card products without requiring a new payment card number and without having to change their account information with merchants. Rather, the cardholder's payment account identifier may remain constant while attributes associated with the payment account identifier may be changed by a payment processor or issuing bank. Issuing banks may also switch payment processors, change payment card products of their customers, or add new payment card products by updating attributes associated with the payment account identifier as opposed to implementing a new information technology system or paying to acquire rights to additional BINs.

Computer messages received and routed by the MRP computing device may originate from various devices within a payment processing network. To the extent a computer message includes transaction data, such messages generally originate during a transaction, such as a transaction associated with a debit card, credit card, loyalty card, rewards card, a payment account, a virtual payment card, an electronic device storing payment account information, and the like, (collectively a "payment card"). During a transaction, transaction data, which may include data regarding the purchased items, the merchant from which the purchase was made, the cardholder, and the like, may be generated and transmitted to entities within the payment processing network including one or more payment processors and financial entities such as acquiring and issuing banks.

The present disclosure provides examples of a MRP computing device in communication with a financial entity or payment processor, or a memory associated with a financial entity or payment processor, that receives and routes computer messages among financial entities and payment processors of a payment processing network.

In certain embodiments of the MRP computing device, the arrangement and format of the payment account identifiers may not carry any independent significance beyond their identification of a particular payment card. As a result, payment account identifiers may be any length and may contain any arrangement of characters provided the arrangement is unique.

Payment account identifiers may be automatically assigned when a new payment card is issued. A cardholder or issuing bank may also be able to choose any available payment account identifier. For example, a cardholder may request a particular payment account identifier or may select a payment identifier from among a plurality of available payment account identifiers.

Although a payment account identifier need not contain particular strings of characters or numbers to convey routing information, strings of characters or numbers within the payment account identifier may nevertheless be used to convey additional information about the original payment card product, the cardholder, the original issuing bank, the original payment processor and the like. Such information may be useful in analyzing purchasing habits, detecting and mitigating fraud, and the like.

The methods and systems described herein may be implemented using computer programming or engineering techniques including computer software, firmware, hardware or any combination or subset thereof, wherein the technical effect is achieved by performing at least one of: (a) storing, within the one or more memory devices, a plurality of payment account identifiers, each payment account identifier identifying a payment account associated with a cardholder of an issuer bank; (b) storing, within the one or more memory devices, message routing instructions associated with each of the plurality of payment account identifiers; (c) receiving, by the MRP computing device, a computer message corresponding to a payment transaction initiated by a first cardholder, the computer message including a first payment account identifier of the plurality of payment account identifiers; (d) performing, by the MRP computing device, a message routing lookup within the one or more memory devices using the first payment account identifier; (e) retrieving, from the one or more memory devices, the message routing instructions associated with the first payment account identifier; and (f) routing the received computer message corresponding to the payment transaction in accordance with the retrieved message routing instructions.

The systems and methods described herein provide the technical advantages of (a) improving utilization of payment card number ranges; (b) reducing the need for and complexity of acquirer message routing systems; (c) improving network bandwidth by eliminating the need to distribute BIN lists to acquirers; and (d) reducing the need to update or modify message routing systems, particularly message routing systems of acquirers, when payment card products are added or modified.

Example of Payment Card Transaction Network

FIG. 1 is a schematic diagram illustrating an example multi-party payment card industry system 20 for authorizing payment card transactions in which parties provide processing services to various financial entities. Embodiments described herein may relate to a payment card system, such as a payment card payment system using the MasterCard® interchange network. The MasterCard® interchange network is a set of proprietary communications standards promulgated by MasterCard International Incorporated for the exchange of financial transaction data and the settlement of funds between financial institutions that are associated with MasterCard International Incorporated. (MasterCard is a registered trademark of MasterCard International Incorporated located in Purchase, N.Y.).

In a typical payment card system, a financial institution referred to as the "issuer" issues a payment card, such as a credit card, debit card, and the like, to the consumer or account holder 22, who uses the payment card to tender payment for a purchase from merchant 24. To accept payment with the payment card, merchant 24 normally establishes an account with a financial institution that is part of the financial payment system. This financial institution is referred to as the "merchant bank," the "acquiring bank," or the "acquirer." In one embodiment, account holder 22, also referred to as cardholder, tenders payment for a purchase using a payment card at a transaction processing device 40 (e.g., a point of sale device), and merchant 24 then requests authorization from a merchant bank 26 for the amount of the purchase. The request is usually performed through the use of a point-of-sale terminal, which reads account information from a magnetic stripe, a chip, embossed characters, and the like, included on the payment card of the account holder 22 and communicates electronically with the transaction processing computers of merchant bank 26. Alternatively, merchant bank 26 may authorize a third party to perform transaction processing on its behalf. In this case, the point-of-sale terminal may be configured to communicate with the third party. Such a third party may be referred to as a "merchant processor," an "acquiring processor," or a "third party processor."

Using an interchange network 28, computers of merchant bank 26 or merchant processor may communicate with computers of an issuer bank 30 to determine whether account 32 of account holder 22 is in good standing and whether the purchase is covered by an available credit line of the account 32 corresponding to account holder 22. Based on these determinations, the request for authorization may be declined or accepted. If the request is accepted, an authorization code may be issued to merchant 24.

When a request for authorization is accepted, the available credit line of the account holder 22 is decreased, that is, account 32 is decreased. A charge for a payment card transaction may not be posted immediately to account 32 of the account holder 22 because payment networks, such as MasterCard International Incorporated, may have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If account holder 22 cancels a transaction before it is captured, a "void" is generated. If account holder 22 returns goods after capture of the transaction, a "chargeback" is generated. Interchange network 28 and/or issuer bank 30 stores the payment card information, such as a type of merchant, amount of purchase, date of purchase, in a database.

After a purchase has been made, a clearing process occurs to transfer additional transaction data related to the purchase among the parties to the transaction, such as merchant bank 26, interchange network 28, and issuer bank 30. According to various aspects herein, during the clearing process, additional data (i.e., addendum data), may be added to the transaction data. Accordingly, addendum data may be associated with a transaction and transmitted between parties to the transaction as transaction data, and may be stored by any of the parties to the transaction.

After a transaction is authorized and cleared, the transaction may be settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Data transmission and other communications between two or more of the parties shown in FIG. 1 generally involve sending, routing, and receiving of computer messages. The term "computer messages" is used broadly in the context of this disclosure and is intended to refer to any message suitable for transmission through a payment card system, such as payment card system 20. Examples of computer messages include, but are not limited to, messages containing transaction data, authorization codes, confirmation codes, requests, commands, settlement data and the like. In certain embodiments, transaction messages are in the ISO 8583 message protocol, which is typically used for sending authorization, clearing, and settlement messages over a payment processing network.

In systems and methods according to this disclosure, a message routing and processing (MRP) computing device 34 routes transaction messages sent through payment card system 20. MRP computing system stores payment account identifiers and message routing instructions associated with each payment account identifier. A message received by MRP computing device 34 may include a payment account identifier and other information, including transaction data. Based at least on the payment account identifier, MRP computing device 34 may look up and retrieve the message routing instructions associated with the payment account identifier to determine a message route. In certain embodiments, MRP computing device 34 looking up and retrieving the message routing instructions may include determining a message route by applying one or more routing rules to payment account attributes associated with payment account identifier and/or the transaction data. After determining a message route, MRP computing device 34 may transmit the message in accordance with the message route.

For example, MRP computing device 34 may receive an authorization message from merchant bank 36. Based on a payment account identifier contained in the authorization message, MRP computing device 34 may determine a message route for routing the message to an interchange network or an issuer, such as interchange network 28 and issuer 26 respectively, associated with the payment account identifier. MRP computing device 34 may then route the message to according to the message route.

Example of a Computer Message Routing and Processing System

Figure 2:
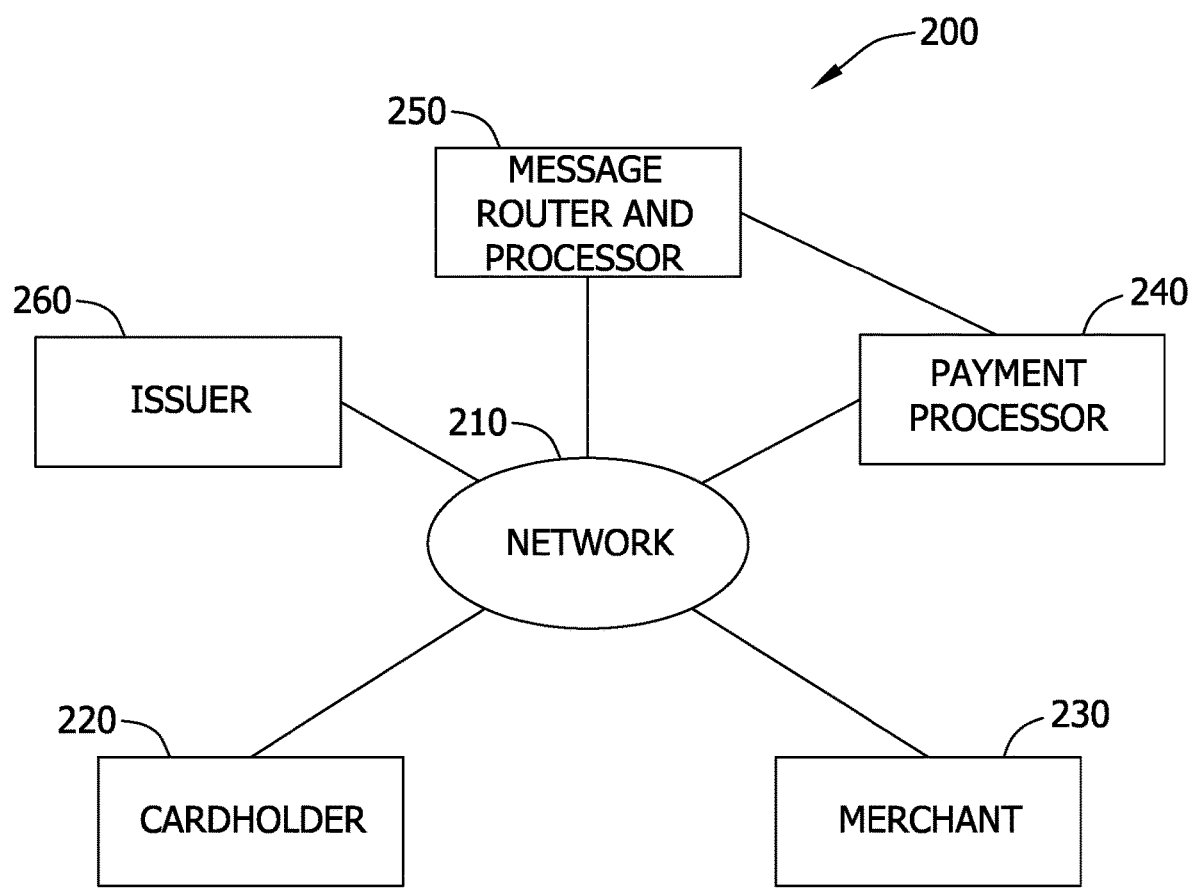
FIG. 2 is a diagram illustrating a computer message routing and processing system, including a message routing and processing computing device, in communication with the payment processing system in accordance with an example embodiment of the present disclosure.

FIG. 2 is a diagram illustrating a message routing and processing (MRP) system including a cardholder, a merchant, a payment processor, an issuer, and a computer message router and processor, which may correspond to a MRP computing device in accordance with an example embodiment of the present disclosure.

Referring to FIG. 2, MRP computing system 200 includes computing devices that respectively represent a cardholder 220, a merchant 230, a payment processor 240, a message router and processor 250, and an issuing bank ("issuer") 260 which are connected to each other via network 210. Network 210 may include the Internet and/or one or more other networks. For example, a connection between the computing devices may include a wireless network, a wired network, a telephone network, a cable network, a combination thereof, and the like. Examples of a wireless network include networks such as WiFi, WiMAX, WiBro, LAN, PAN, MAN, cellular, Bluetooth, and the like.

Cardholder 220 may be a computing device, for example, a mobile phone, a smart phone, a telephone, a computer, a laptop, a desktop, a tablet, an MP3 player, a digital assistant, a wearable device, a server, and the like. Cardholder 220 may access a website that corresponds to the merchant 230 or that is hosted by merchant 230, may contact a phone number of merchant 230, and the like. Cardholder 220 may also make a purchase from merchant 230.

In response to cardholder 220 entering into a transaction with merchant 230, transaction data corresponding to the transaction may be provided to payment processor 240 for authorization. For example, the payment processor 240 may be a processing entity such as MASTERCARD®, VISA®, AMERICAN EXPRESS®, and the like. Issuer 260 may be a third-party bank that issued a payment card to cardholder 220. For example, issuer 260 may correspond to payment processor 240. When cardholder 220 attempts to authorize a transaction using an account associated with a payment card issued by issuer 260, merchant 230 may transmit the transaction data inside an authorization request message to payment processor 240 to determine whether cardholder 220 has a sufficient amount of money in their account to cover the cost of the transaction. In response, payment processor 240 may verify with issuer 260 that cardholder 220 has sufficient funds.

The lifecycle of the transaction may include an authorization process, a clearing process, and a settlement process. During the authorization process, transaction data for authorizing the transaction may be transmitted between merchant 230, payment processor 240, and issuer 260 in one or more computer messages. For example, the transaction data included within the authorization request message may include a name, an account number, a transaction amount, a date and/or a time of the transaction, and the like. The message may further include a payment account identifier associated with a cardholder, such as cardholder 220. At this point in the transaction, the transaction data included in the authorization process may be only that data which is necessary to approve the transaction. Payment processor 240 may verify with the issuer 260 that cardholder 220 has sufficient funds in their account to cover a cost of the transaction.

When the transaction is approved by issuer 260 via an authorization response message, the issuer 260 may send an affirmative authorization message to payment processor 240, which may in turn transmit the affirmative message to merchant 230. This process typically occurs within a few seconds to a few minutes of the request to authorize the transaction. After the transaction has been authorized, the transaction may be forwarded to the payment processor 240 for clearing and settlement typically later that same day, week, and the like. The settlement process includes the funds being transferred from a cardholder's bank to a merchant's bank. During settlement, prior to settlement, and/or after settlement, a clearing process occurs for the transaction. The clearing process typically includes arranging bank/credit accounts for transfer of money/securities. For example, the clearing process may include payment processor 240 validating information and approving the purchase information from the merchant 230. According to various aspects, during the clearing process, the transaction data obtained during authorization may be supplemented with addendum data by the merchant 230, the payment processor 240, and the like. The clearing process may be completed after the authorization of the transaction is completed, for example, at the end of the same business day, one day later, two days later, and the like.

Addendum data may be added during a transaction lifecycle, for example, during the clearing process (if not included in the authorization process) and may include additional information about a transaction, one or more items purchased in the transaction, merchant information, cardholder information, and the like, which was not available during the authorization process. As another example, the addendum data may include information that was available during the authorization process but that was not processed during the authorization process. As yet another example, the addendum data may include information subsequently added to the transaction after the authorization process, and the like. Also, as described herein, transaction data may include authorization data and addendum data. In some examples, the authorization data and the addendum data may partially overlap, or not overlap at all. In some cases, the addendum data may be added, or partially added during the authorization process. As another example, the addendum data may be added after the authorization process.

According to various exemplary aspects, message router and processor 250 facilitates communication within MRP system 200. Here, message router and processor 250 may be coupled to or included within payment processor 240, issuer 260, merchant 230, and the like. As another example, message router and processor 250 may be a separate device connected to one or more of the other computing devices through network 210. Message router and processor 250 may receive messages from and route messages between any of payment processor 240, issuer 260, merchant 230, and any other computing device within MRP system 200 based on a payment account identifier contained within the message and associated with a cardholder. During the authorization process, for example, message router and processor 250 may route messages containing authorization data from merchant 230 to payment processor 240 and issuer 260. Message router and processor 250 may also route a response message from payment processor 240 or issuer 260 to merchant 230 indicating whether a cardholder's account has sufficient funds to cover the cost of a transaction. Message router and processor 250 may also be used to route other messages containing transaction data during the clearing process and the settlement process.

Example of a Message Routing and Processing Computing Device

Figure 3:
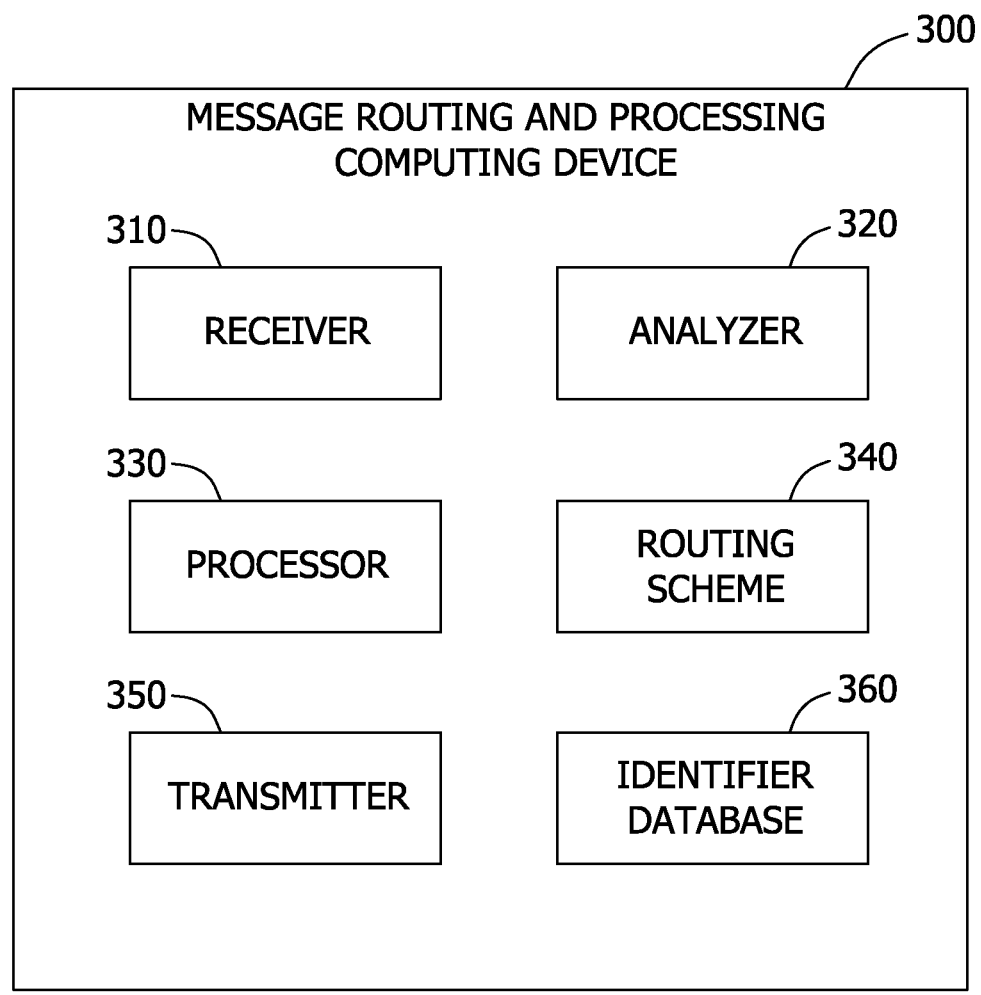
FIG. 3 is a diagram illustrating an example of a message routing and processing computing device as shown in FIG. 2.

FIG. 3 is a diagram illustrating an example embodiment of a MRP computing device 300 that may be included in the message routing and processing system of FIG. 2, in accordance with an example embodiment of the present disclosure.

Referring to FIG. 3, MRP computing device 300 may correspond to message router and processor 250 as shown in FIG. 2. MRP computing device 300 may be coupled to payment processor 240 or may be a separate computing device included in MRP system 200 and may be connected to one or more of the other computing devices via the network 210. In this example, MRP computing device 300 includes a receiver 310, an analyzer 320, a processor 330, a routing scheme 340, a transmitter 350, and an identifier database 360. The MRP computing device 300 may include additional components not shown or fewer components than depicted. Also, one or more of the components in this example may be combined or may be replaced by processor 330. The computer components described herein (e.g., receiver 310, analyzer 320, processor 330, routing scheme 340, transmitter 350, and identifier database 360) may include hardware and/or software that are specially configured or programmed to perform the steps described herein.

Receiver 310 generally receives incoming messages sent over an MRP system, such as MRP system 200 of FIG. 2. Receiver 310 may receive messages from another computing device, for example, a computing device of a payment processor, a merchant, a bank, and the like, via one or more network connections, a direct connection, and the like. Receiver 310 may also receive messages generated by MRP computing device 300.

A message received by receiver 320 may be analyzed to determine how the message should be routed within an MRP system. For example, analyzer 320 may extract data from a message received by receiver 310 and determine how to route the message based on the extracted data. In certain embodiments, analyzer 320 may extract a payment account identifier corresponding to a payment card product of a cardholder. Other data that may be extracted by analyzer 320 may include, but is not limited to, a source of the message, a type of the message, a size of the message, and the like.

Based on at least the payment account identifier, analyzer 320 may determine how to route the message. MRP computing device 300 may include a routing scheme 340 containing message routing instructions describing how messages are to be routed by MRP computing device 300. In certain embodiments, routing scheme 340 may include one or more routing tables. Routing tables may include entries containing routing instructions corresponding to payment account identifiers. In certain embodiments, routing tables may include multiple entries for each payment account identifier for additional routing instructions based on one or more other pieces of extracted data, such as the source or content of a message.

In addition to or as an alternative to routing tables, routing scheme 340 may also include one or more routing rules in the form of logical tests, business rules, and the like. Such routing rules may be applied by analyzer 320 to payment account attributes associated with a payment card identifier or included in transaction data contained in a message to be routed by MRP computing device 300. In certain embodiments, payment account attributes may be stored in and retrieved from an identifier database 360, which is describe in more detail below. In such embodiments, determining a message route may include retrieving one or more primary account attributes from identifier database 360 and applying routing rules stored in routing scheme 340 to determine the message route. In other embodiments, payment account attributes may be included in transaction data contained in a computer message. For example, payment account attributes may include a merchant name, a source of the message, an amount of the transaction, a geographic location of the transaction, a destination of the message, and the like.

Routing scheme 340 may be modified as changes occur to a MRP system. When a new payment card account is created, for example, routing scheme 340 may be supplemented with new entries in a routing table or new routing rules entries corresponding to the new payment account identifier of the new payment card account. Similarly, if a cardholder closes a payment card account, any entries of the routing table or routing rules corresponding to the payment account identifier of the closed payment card account may be removed from routing scheme 340. In systems according to this disclosure a payment account identifier associated with a payment card account remains constant for the life of the account even if the underlying payment card product or characteristics of the underlying payment card product change. Accordingly, if a cardholder changes their payment card account, such as by changing to a new payment card product, entries in routing tables or routing rules associated with the cardholder's payment account identifier are updated to reflect any such changes. Updating entries or rules may include deleting and replacing routing table entries or routing rules, partially deleting or overwriting routing table entries of routing rules, and the like. To the extent a change renders existing routing table entries or routing rules redundant, such routing table entries or routing rules may be removed from routing scheme 340. Similarly, to the extent changes to a cardholder's payment card account require additional routing table entries or routing rules, new routing table entries or routing rules associated with the cardholder's payment account identifier may be added to routing scheme 340.

Functions of MRP computing device 300 and components thereof may be performed in whole or in part by processor 330. For example, processor 330 may be configured to assist or otherwise perform the analysis tasks of analyzer 320. In certain embodiments, processor 330 may perform additional functions including, but not limited, to updating routing scheme 340, installing software or firmware updates, monitoring performance of MRP computing device 300, and logging messages routed by MRP computing device 300.

After analyzer 320 and/or processor 330 determine a route for a message, the message may be transmitted by transmitter 350. Transmitter 350 may transmit messages from MRP computing device 300 to another computing device, for example, a computing device of a payment processor, a merchant, a bank, and the like, via one or more network connections, a direct connection, and the like.

As previously noted, MRP computing device 300 may also include an identifier database 360 in which MRP computing device 300 maintains information associated with each payment account identifier. The information stored in identifier database 360 may include message routes corresponding to the payment account identifier, personal information of the cardholder associated with the payment account identifier, details regarding the payment card product associated with the payment account identifier, historical information associated the payment account identifier, and the like. Analyzer 320 and processor 330 may refer to records in identifier database 360 and their associated attributes, particularly routing information, to determine message routes. Examples of personal information that may be stored as attributes in identifier database 360 include, but are not limited to, a primary cardholder name, a secondary cardholder name, a billing address/zip code, and a billing name. Information regarding a payment card product that may be stored as attributes in identifier database 360 may include, but is not limited to, a current payment card product, a previous payment card product, a tier within a current or previous payment card product, a current payment processor associated with a current payment card product, a previous payment processor associated with a previous payment card product, a current issuing bank associated with a current payment card product, a previous issuing bank associated with a previous payment card product, applicable rewards programs, and a product expiration date. Historical information may include the original issue date of the payment account identifier and dates corresponding to changes of other attributes such as a current payment card product.

Although identifier database 360 is described as being a component of MRP computing device 300, in other embodiments, identifier database 360 may be incorporated into one or more other devices in MRP systems such as payment processor computing devices.

Identifier database 360 generally includes at least one record for each payment account identifier in a payment processing system. As routing information, personal information of the cardholder associated with a payment account identifier, details regarding the payment card product associated with the payment account identifier, historical information associated the payment account identifier, and the like change, the payment account identifier is maintained but information stored in identifier database 360 may be updated to reflect any changes. Because the payment account identifier is maintained even when underlying attributes are changed, a cardholder may continue to use the same payment account identifier to make purchases even if such changes would require issuance of a new card in known BIN-based routing systems. For example, a cardholder could set up an automatic bill payment using his or her payment account identifier at a time when he or she is enrolled in a first payment card program. If the cardholder then signs up for a more favorable payment card program, such as one with a better interest rate or better rewards, information stored in identifier database 360 associated with the cardholder's payment account identifier may be updated to reflect the new payment card program while maintaining the cardholder's payment account identifier. Accordingly, the payment account identifier provided by the cardholder to set up the automatic bill payment need not be changed to continue making bill payments.

In certain embodiments, MRP computing device 300 may also perform additional functions handled by acquiring banks, issuing banks, and payment processors in known payment processing systems. For example, acquiring banks commonly perform interchange qualification, which generally entails determining which of a plurality of interchange rates apply to a payment card transaction. To perform interchange qualification, acquiring banks generally cross-reference transaction data with interchange rate tables provided by payment processors. Interchange rates change relatively frequently and, as a result, acquiring banks are required to download and update their interchange tables at the same frequency. In embodiments according to the present disclosure, MRP computing device 300 may include an interchange rate table and all interchange rate qualification in a payment processing network may be performed by the MRP computing device 300. By doing so, the need for acquiring banks to download and update interchange rate tables and the costs associated with such downloads and maintenance may be reduced or eliminated. Rather, to the extent payment processors make any changes to interchange rate tables, only the table of MRP computing device 300 requires updating.

Examples of Message Routing in Computer Message Routing and Processing Systems

Figure 4:
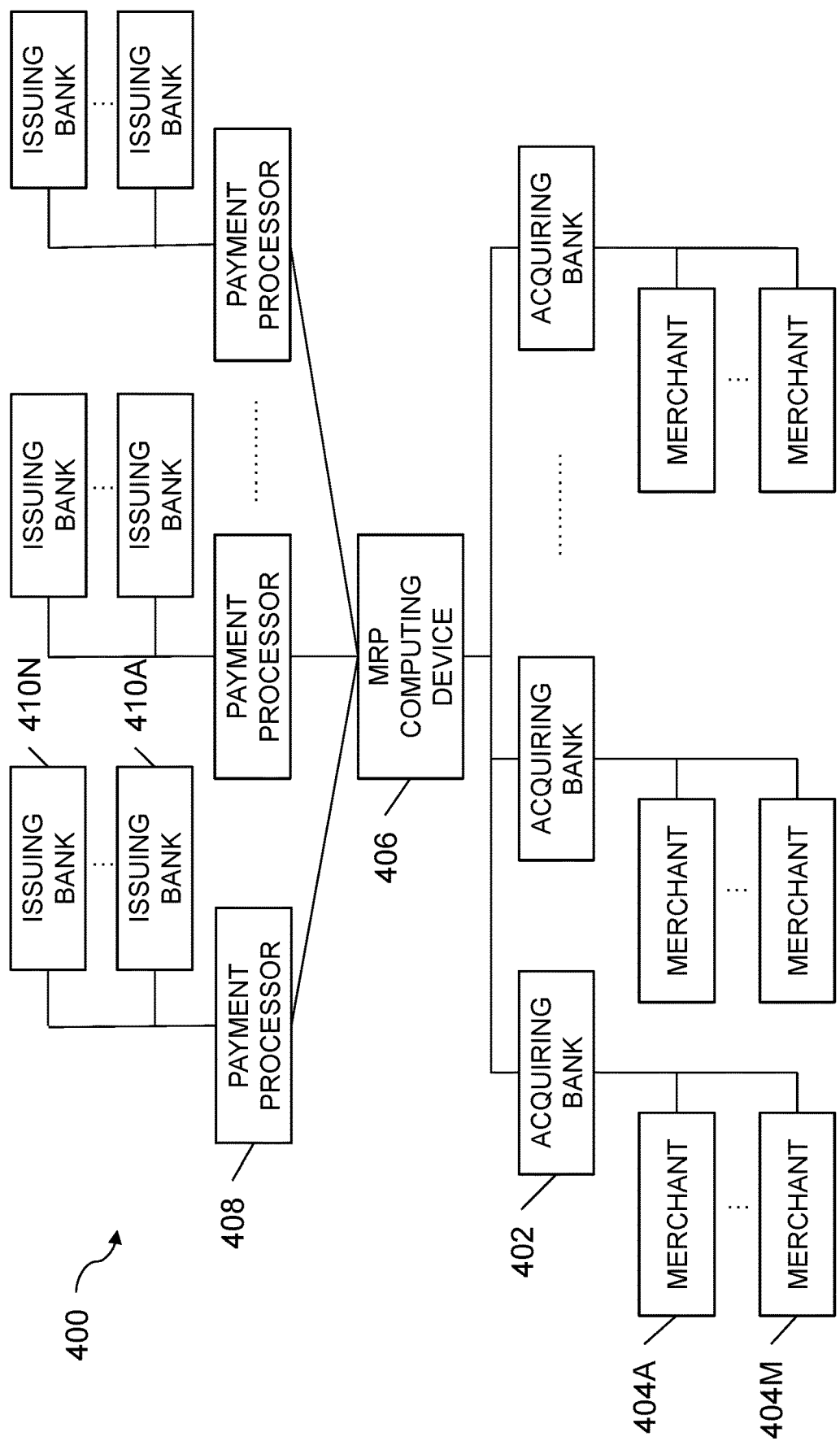
FIG. 4 is a diagram illustrating a first example of a message routing map in accordance with an example of the present disclosure.
Figure 5:
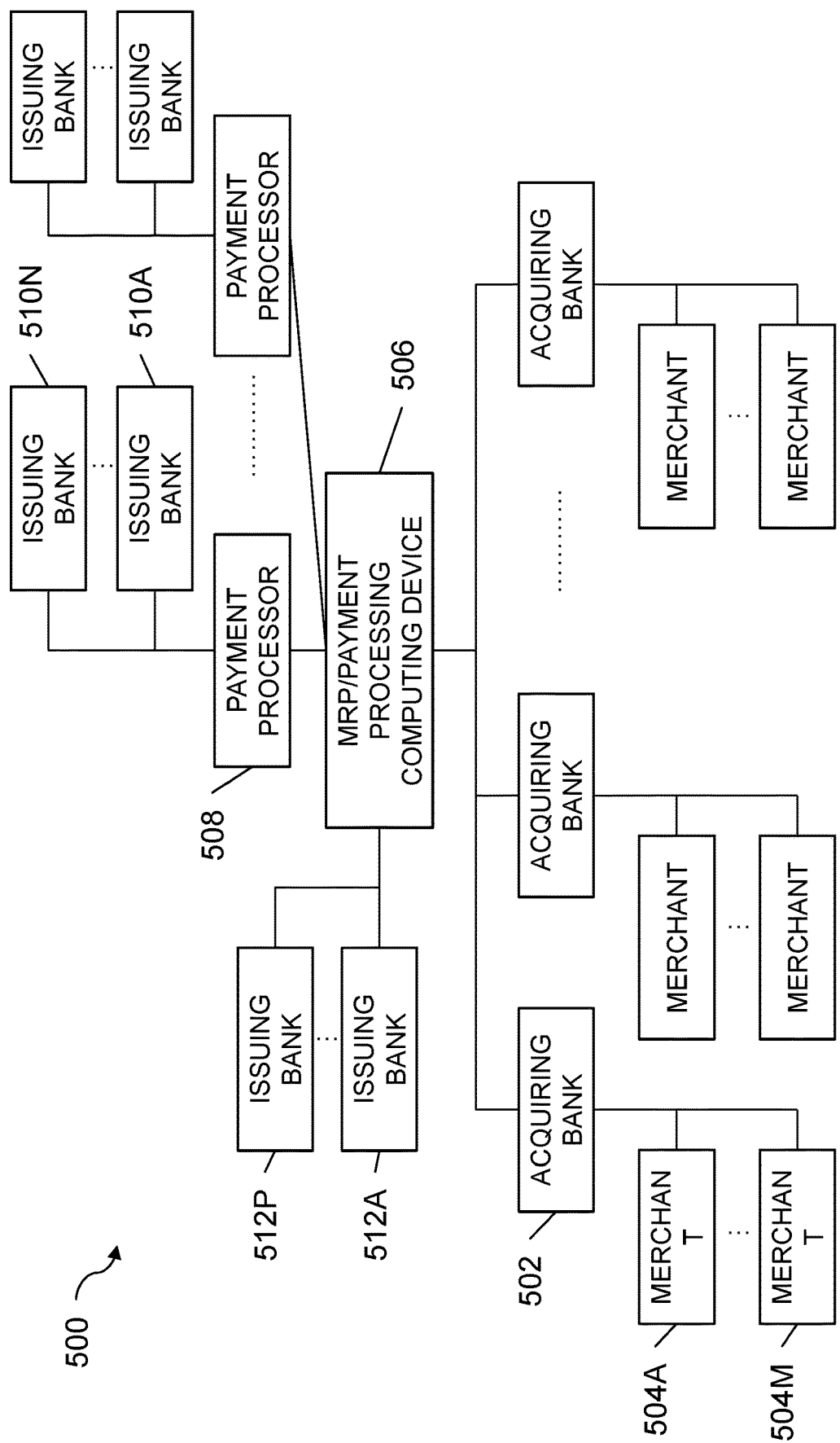
FIG. 5 is a diagram illustrating a second example of a message routing map in accordance with an example of the present disclosure.
Figure 6:
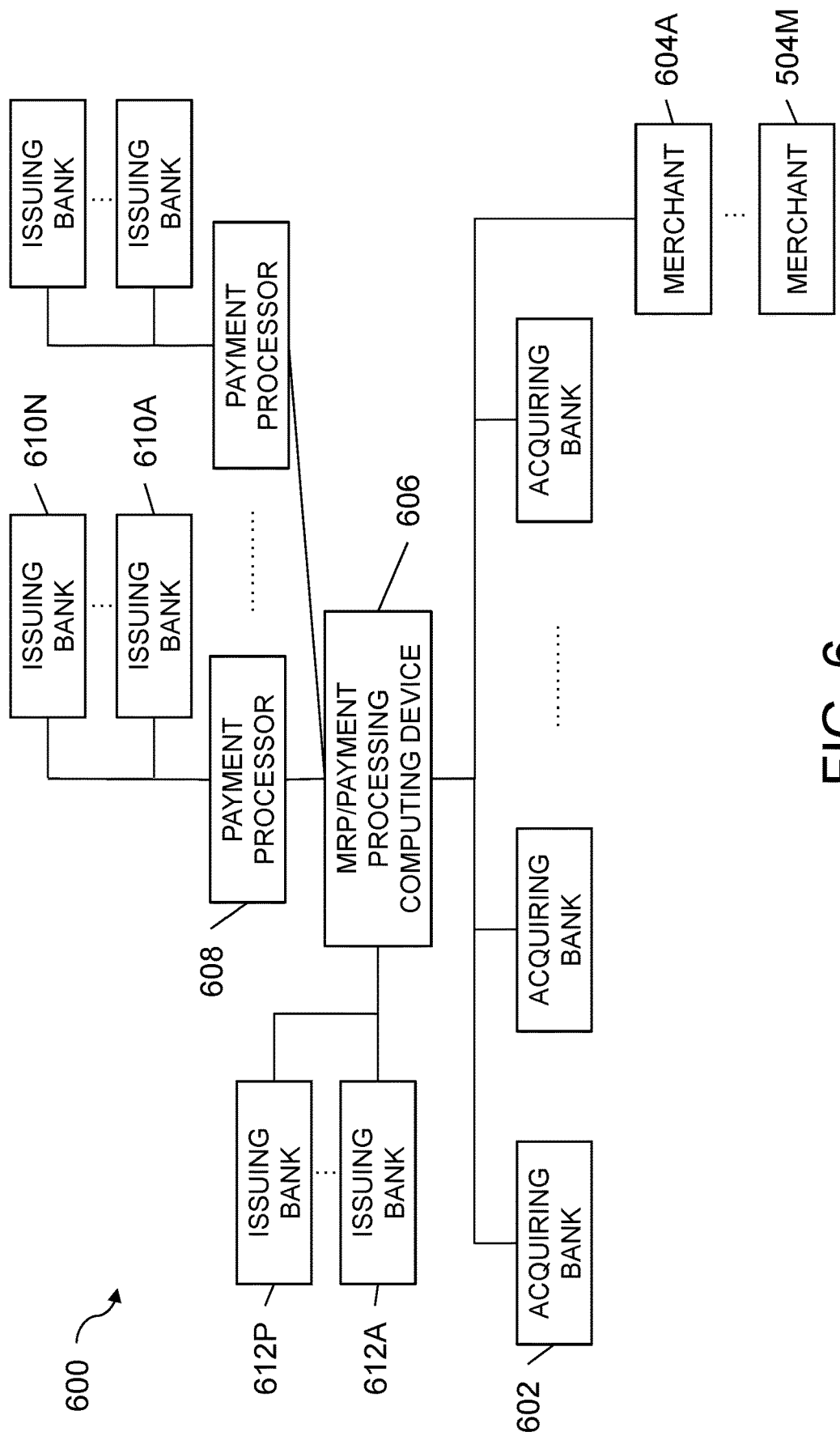
FIG. 6 is a diagram illustrating a third example of a message routing map in accordance with an example of the present disclosure.

Each of FIGS. 4-6 is a schematic depicting a message routing map of MRP systems according to embodiments of this disclosure. The message routes depicted generally apply to messages routed based, at least in part, on payment account identifiers included in the messages. Specifically, in each embodiment, messages containing payment account identifiers may be transmitted to a MRP computing device by other devices within the message routing and processing system. The MRP computing device may then determine, based at least in part on the payment account identifier, how to route the message to one or more other devices within the MRP system.

The embodiments of FIGS. 4-6 are intended only as examples of message routing maps in MRP systems according to this disclosure. Other MRP systems may include more or fewer message routes, additional or alternative message routes (including direct message routes between any devices of an MRP system), or additional MRP computing devices. To the extent discussions in this disclosure is limited to messages being routed or transmitted between devices in one direction, any such discussions should be understood to apply to messages passed in the opposite direction as well.

FIG. 4 is a message routing map 400 according to one embodiment of a MRP system according to the present disclosure. Message routing map 400 includes message routes between different devices in the MRP system. Specifically, message routing map 400 depicts one or more acquiring banks, for example acquiring bank 402, with each acquiring bank being communicatively coupled to multiple merchants, for example merchants 404A to 404M. Merchant 404M represents the mth merchant communicatively coupled to acquiring bank 402, where m is any number of merchants. Each acquiring bank is communicatively coupled to a MRP computing device 406, such as MRP computing device 300 of FIG. 3. MRP computing device 406 is communicatively coupled to multiple payment processors, such as payment processor 408, which are in turn communicatively coupled to multiple issuing banks, such as issuing banks 410A to 410N. Issuing bank 410N represents the nth issuing bank communicatively coupled to payment processor 408, where n is any number of issuing banks.

During operation, messages generated and transmitted by any of the issuing banks, payment processors, acquiring banks, and merchants may be transmitted to MRP computing device 406 for analysis and routing determinations. For example, during authorization, a message originating at merchant 404A may include a cardholder's payment account identifier, authorization data, and other data associated with the transaction. The message may be passed from merchant 404A to acquiring bank 402 and on to MRP computing device 406. MRP computing device 406 may then extract the payment account identifier and, based on a routing scheme of MRP computing device 406, determine how to route the message.

Authorization generally includes determining whether a cardholder has sufficient credit for a transaction. To do so, authorization data is generally transmitted to and analyzed by one or both of the cardholder's payment processor and the cardholder's issuing bank. Accordingly, in the present example, MRP computing device 406 may determine based on the payment account identifier as applied to the routing scheme of MRP computing device 406 that the current transaction is by a cardholder of issuing bank 410A and payment processor 408. MRP computing device 406 may then route the message to either or both of issuing bank 410A and payment processor 408.

FIG. 5 is a message routing map 500 according to another embodiment of a MRP system according to the present disclosure. Message routing map 500 includes message routes between different devices in the MRP system. Specifically, message routing map 500 depicts one or more acquiring banks, for example acquiring bank 502, with each acquiring bank being communicatively coupled to multiple merchants, for example merchants 504A to 504M. Merchant 504M represents the mth merchant communicatively coupled to acquiring bank 502, where m is any number of merchants. Each acquiring bank is communicatively coupled to a MRP/payment processor computing device 506. Unlike the embodiment of FIG. 4, in which MRP computing device 406 was independent of the payment processors, MRP/payment processor computing device 506 of FIG. 5 represents an MRP computing device integrated into a payment processor. MRP/payment processing computing device 506 is communicatively coupled to multiple payment processors, such as payment processor 508, which are in turn communicatively coupled to multiple issuing banks, such as issuing banks 510A to 510N. Issuing bank 510N represents the nth issuing bank communicatively coupled to payment processor 508, where n is any number of issuing banks. However, because MRP/payment processing computing device 506 is also a payment processor, MRP/payment processing computing device 506 is also communicatively coupled to issuing banks 512A to 512P corresponding to issuing banks of the payment processor of MRP/payment processing computing device 506. Issuing bank 512P represents the pth issuing bank communicatively coupled to payment processor 508, where p is any number of issuing banks.

During operation, messages generated and transmitted by any of the issuing banks, payment processors, acquiring banks, and merchants may be transmitted to MRP/payment processing computing device 506 for analysis and routing determinations. For example, issuing bank 512A may receive authorization data from a transaction by a cardholder at merchant 504A. In response to the authorization data, issuing bank 512A may generate an authorization message containing the payment account identifier of the cardholder, an indicator of whether the transaction is authorized, and other data associated with the transaction. The message may be passed from issuing bank 512A to MRP/payment processor computing device 506. MRP/payment processor computing device 506 may then extract the payment account identifier and, based on a routing scheme of MRP computing device 506, determine how to route the message.

In response to an authorization request made in the context of a cardholder transaction with a merchant, an indication of whether or not the transaction is authorized (e.g., if the cardholder has sufficient funds) may be transmitted to the merchant. Accordingly, in the present example, MRP/payment processing computing device 506 may determine based on the payment account identifier as applied to the routing scheme of MRP computing device 506 that the authorization message corresponds to a transaction by the cardholder associated with the payment account identifier at merchant 504A. MRP/payment processing computing device 506 may then route the message to acquiring bank 502 for forwarding to merchant 504A.

If the authorization request in the previous example were instead to be received by issuing bank 510A, the process would be significantly similar. Specifically, in response to the authorization data, issuing bank 510A may generate an authorization message containing the payment account identifier of the cardholder, an indicator of whether the transaction is authorized, and other data associated with the transaction. The message may be passed from issuing bank 512A to payment processor 508 and forwarded to MRP/payment processor computing device 506. MRP/payment processor computing device 506 may then extract the payment account identifier and, based on a routing scheme of MRP/payment processing computing device 506, determine how to route the message.

FIG. 6 is a message routing map 600 according to a third embodiment of a MRP system according to the present disclosure. Message routing map 600 includes message routes between different devices in the MRP system. Specifically, message routing map 600 depicts one or more acquiring banks, for example acquiring bank 602 communicatively coupled to a MRP/payment processor 606. In contrast to message routing maps 500 and 600 of FIGS. 4 and 5, respectively, in which merchants were communicatively coupled to acquiring banks, message routing map 600 includes merchants 604A to 604M that are communicatively coupled directly to MRP/payment processor 606. Merchant 604M represents the mth merchant communicatively coupled to MRP/payment processor 606, where m is any number of merchants. Like MRP/payment processing computing device 506 of FIG. 5, MRP/payment processor computing device 506 of FIG. 5 represents an MRP computing device integrated into a payment processor. MRP/payment processing computing device 606 is communicatively coupled to multiple payment processors, such as payment processor 608, which are in turn communicatively coupled to multiple issuing banks, such as issuing banks 610A to 610N. Issuing bank 510N represents the nth issuing bank communicatively coupled to payment processor 508, where n is any number of issuing banks. However, because MRP/payment processing computing device 606 is also a payment processor, MRP/payment processing computing device 606 is also communicatively coupled to issuing banks 612A to 612P corresponding to issuing banks of the payment processor of MRP/payment processing computing device 606. Issuing bank 612P represents the pth issuing bank communicatively coupled to payment processor 608, where p is any number of issuing banks.

During operation, messages generated and transmitted by any of the issuing banks, payment processors, acquiring banks, and merchants may be transmitted to MRP/payment processing computing device 606 for analysis and routing determinations. For example, during a clearing process, merchant 602A may generate a message containing transaction data for a plurality of transactions. The transaction data may be stored as individual records, with each record including the payment account identifier of the cardholder who made the transaction and other data associated with the transaction. The message containing the transaction data may be passed from merchant 604A to MRP/payment processor computing device 606.

An MRP computing device in accordance with this disclosure may receive one or more messages containing bulk transaction data corresponding to multiple transactions. The MRP computing device may identify the payment account identifier associated with each transaction and determine whether the bulk data includes transaction data to be sent to two or more different devices in the MRP system. To the extent this is the case, the MRP computing device may break up the bulk data into a set of messages for distribution. In certain embodiments, the MRP computing device may create a new message for each unique piece of transaction data of the bulk data at route the new messages accordingly. The MRP computing device may also combine some or all transaction data to be sent to a particular device within the MRP system into a single message and route the message the particular device.

In light of the foregoing, MRP/payment processor 606 may analyze the message received from merchant 604A and determine to which of the payment processors and issuing banks the transaction data is to be sent. For example, MRP/payment processor 606 may determine that the message received from merchant 604A contains transaction data to be sent to issuing bank 610A, issuing bank 612A, payment processor 608 and the payment processor of MPC/payment processor computing device 606. Accordingly, MPC/payment processing computing device may transmit the transaction data to each of issuing bank 610A, issuing bank 612A, and payment processor 608 in separate messages and retain the transaction data intended for the payment processor MPC/payment processor 606.

Example of a Method for Computer Message Routing and Processing

Figure 7:
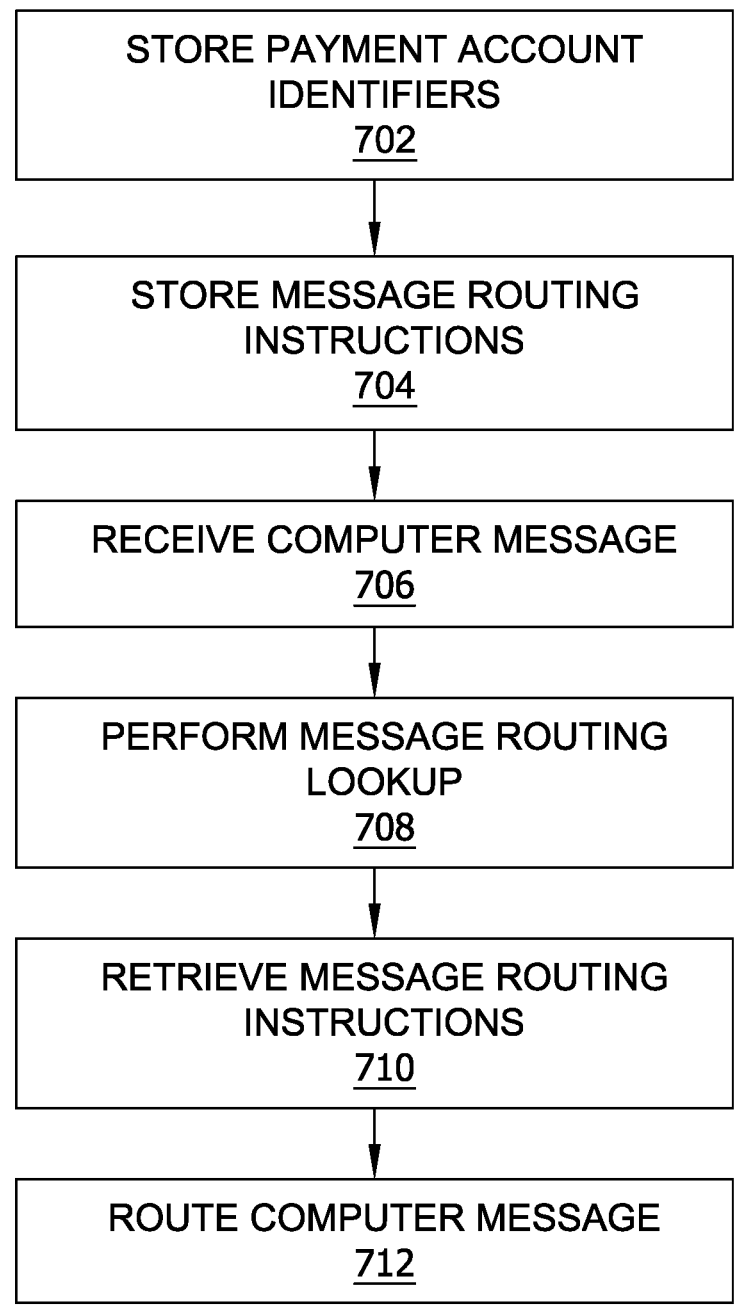
FIG. 7 is a flowchart illustrating an example method of routing and processing computer messages in accordance with an example embodiment of the present disclosure.

FIG. 7 is a diagram illustrating an example of a method 700 performed by a MRP computing device, such as MRP computing device 300 of FIG. 3, according to an example embodiment of the present disclosure.

Method 700 includes storing one or more payment account identifiers 702 associated with cardholders. In certain embodiments, payment account identifiers may be stored in an identifier database, such as identifier database 360 of FIG. 3. In addition to payment account identifiers, an identifier database may store information associated with the payment account identifier including, but not limited to, routing information, personal information of the cardholder associated with a payment account identifier, details regarding the payment card product associated with the payment account identifier, historical information associated the payment account identifier, and the like.

In addition to storing payment account identifiers, methods according to this disclosure may include storing message routing instructions 704. In certain embodiments, message routing instructions may be stored in a routing scheme, such as routing scheme 340 of FIG. 3. The routing scheme may store the message routing instructions in various ways. For example, in some embodiments, message routing instructions may be stored in one or more data tables that associate specific message routes with payment account identifiers. In other embodiments, message routing instructions may be stored as one or more rules that may be applied by a MRP computing device to payment account attributes in order to determine a message route.

MRP computing devices may then receive a computer message 706 including a payment account identifier. The computer message may be received from any computing device in a payment network including, but not limited to, a payment processor, an acquiring bank, an issuer, and a merchant, such as those described in the context of MRP system 200 of FIG. 2. In the embodiments of FIGS. 4-6, for example, MRP computing devices 400, 500, and 600, respectively, may receive messages from any of the plurality of payment processors and any of the plurality of acquiring banks included in FIGS. 4-6. The computer message may include, but is not limited to including, transaction data corresponding to a transaction of the cardholder associated with the payment account identifier. In certain embodiments, messages may be received by MRP computing device in batches containing more than one message may be received. To the extent MRP computing device receives such a batch, MRP computing device may process each message individually.

After a computer message is received, the MRP computing device may perform a message routing lookup 708 based, at least in part, on the payment account identifier contained in the computer message. To do so, MRP computing device may extract the payment account identifier from the message and cross-reference the payment account identifier of the message with data table entries or routing rules in the routing scheme. In addition to the payment account identifier, an MRP computing device may perform a message routing lookup based further on one or more of payment account attributes (which may include payment account information stored in an identifier database) and transaction data contained in the message.

After performing a message routing lookup, an MRP computing device may retrieve the corresponding message routing instructions. In embodiments in which the routing scheme includes a data tables containing message routing instructions associated with payment account identifiers, an MRP computing device may retrieve the message routing instructions by reading data from the data table. In embodiments in which the routing scheme includes a series of rules, retrieving the message routing instructions may include applying the rules contained in the routing scheme to the payment account identifier. Any lookup or rule application performed by MRP computing device may also be based, in part, on other data including, but not limited to, payment account information stored in an identifier database, payment account attributes, and transaction data contained in the message to be routed.

The MRP computing device may also perform additional functions based on the content of a received message. For example, in certain embodiments, the MRP computing device may determine an interchange rate for a transaction based, at least in part, on a portion of the transaction data contained in a received message.

After a message route is determined, computer message may be transmitted by the MRP computing device in accordance with the message route 712. In certain instances, the MRP computing device may forward the computer message as received by the MRP computing device in accordance with the message route. The MRP computing device may also extract a portion of the computer message, include the portion in a new message, and transmit the new message in accordance with the message route. For example, if a message includes transaction data to be sent to multiple payment processors, the MRP computing device may organize the transaction data included in the original message into a plurality of payment processor messages, each payment processor message include transaction data to be routed to a particular payment processor. The MRP computing system may transmit the computer message or computer messages derived therefrom to any of a payment processor, an acquiring bank, an issuing bank, or a merchant, as described in the context of MRP system 200 of FIG. 2.

In certain embodiments, computer messages received by the MRP computing device are in International Organization for Standardization (ISO) 8583 format. In such embodiments, routing received computer messages further includes generating an appropriate header including necessary routing information. For example, in one embodiment, MRP computing device generates a transaction protocol data unit (TPDU) header, appends the TPDU header to the received ISO 8583 message, and transmits the received message in accordance with the destination data stored in the TPDU header. TPDU headers generally include a message destination field including destination bit fields and source bit fields. More specifically, the destination field generally includes a first bit field corresponding to the final destination of a message and a plurality of second bit fields corresponding to addresses of intermediate routers between the source device and the final destination. TPDU headers further include a plurality of source bit fields configured to store addresses of devices through which a message passes.

Accordingly, generating the TPDU header generally includes performing a lookup in a routing table to determine the appropriate bit field configurations to route the received message to the appropriate destination and populating the destination bit fields accordingly. Generating the TPDU header further includes populating a source bit field with a source address corresponding to the MRP computing device.

Additional Considerations

Computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "card," "transaction card," "financial transaction card," and "payment card" refer to any suitable payment card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include, but is not limited to, purchases, management activities (e.g., balance checking), bill payments, achievement of targets (meeting account balance goals, paying bills on time), and/or product registrations (e.g., mobile application downloads).

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A message routing and processing (MRP) computing device for routing computer messages over a payment processing network, wherein the MRP computing device is communicatively coupled to a plurality of payment processors and a plurality of financial institutions, the MRP computing device comprising:
one or more memory devices that store message routing instructions for each of a plurality of account identifiers; and
one or more processors in communication with the one or more memory devices, the one or more processors configured to:
receive, from one or more of the plurality of financial institutions, a plurality of electronic messages in a standard electronic data format for financial messages including a first electronic message, each received electronic message associated with a financial transaction initiated by an accountholder and including an account identifier, the account identifier identifying an account issued by an account issuer to the accountholder;
retrieve, from the one or more memory devices, message routing instructions for the first electronic message of the plurality of received electronic messages, the message routing instructions for the first electronic message retrieved using the account identifier included within the first electronic message; and route the first electronic message to an associated payment processor of the plurality of payment processors based upon the retrieved message routing instructions by:
generating a message header for the first electronic message, the message header including the retrieved message routing instructions formatted using the standard electronic data format for financial messages, wherein the message header includes an address for the associated payment processor;
modifying the first electronic message by appending the message header to the first electronic message; and
transmitting the modified first electronic message according to the message routing instructions included within the message header.

2. The MRP computing device of claim 1, wherein the standard electronic data format is an International Organization for Standardization (ISO) format.

3. The MRP computing device of claim 1, wherein the message header includes a message destination field that includes a first destination bit field, and a message source field that includes a plurality of source bit fields, and wherein generating the message header for the first electronic message further comprises:
populating the first destination bit field with the address for the associated payment processor; and
populating one of the source bit fields with a source address corresponding to the MRP computing device.

4. The MRP computing device of claim 3, wherein the message destination field of the message header includes a plurality of second destination bit fields, and wherein generating the message header further comprises populating each of the plurality of second destination bit fields with a corresponding address associated with a router disposed between the MRP computing device and the associated payment processor of the first electronic message.

5. The MRP computing device of claim 3, wherein generating the message header further comprises:
storing, within the one or more memory devices, a routing table;
performing a lookup within the routing table to determine appropriate bit field configurations associated with routing the first electronic message; and
populating the one of the source bit fields based upon the performed lookup.

6. The MRP computing device of claim 3, wherein the plurality of source bit fields is configured to store addresses of devices through which the first electronic message passes.

7. The MRP computing device of claim 1, wherein the message routing instructions include message routes, and wherein the MRP computing device is further configured to identify a respective message route associated with each of the plurality of account identifiers.

8. The MRP computing device of claim 1, wherein the message routing instructions include routing rules for deriving a message route, and wherein the MRP computing device is further configured to apply the routing rules to financial account attributes associated with each of the plurality of account identifiers to derive a respective message route associated with each account identifier.

9. The MRP computing device of claim 1, wherein the MRP computing device is further configured to update, within the one or more memory devices, the message routing instructions, wherein the update is not propagated to the plurality of financial institutions.

10. The MRP computing device of claim 9, wherein updating the message routing instructions further comprises updating the message routing instructions stored within the one or more memory devices for a first account identifier when one of the plurality of payment processors associated with the first account identifier is changed from a first payment processor to a second payment processor.

11. The MRP computing device of claim 9, wherein updating the message routing instructions further comprises updating the message routing instructions stored within the one or more memory devices for a first account identifier, without requiring modification by a respective financial institution associated with the first account identifier, when a first payment processor of the plurality of payment processors associated with the first account identifier is changed to a second payment processor of the plurality of payment processors.

12. A computer-implemented method for routing computer messages over a payment processing network, the method implemented using a message routing and processing (MRP) computing device communicatively coupled to a plurality of payment processors and a plurality of financial institutions, wherein the MRP computing device comprises one or more memory devices and one or more processors in communication with the one or more memory devices, the one or more memory devices storing message routing instructions for each of a plurality of account identifiers, the method comprising:
receiving, from one or more of the plurality of financial institutions, a plurality of electronic messages in a standard electronic data format for financial messages including a first electronic message, each received electronic message associated with a financial transaction initiated by an accountholder and including an account identifier, the account identifier identifying an account issued by an account issuer to the accountholder;
retrieving, from the one or more memory devices, message routing instructions for the first electronic message of the plurality of received electronic messages, the message routing instructions for the first electronic message retrieved using the account identifier included within the first electronic message; and
routing the first electronic message to an associated payment processor of the plurality of payment processors based upon the retrieved message routing instructions by:
generating a message header for the first electronic message, the message header including the retrieved message routing instructions formatted using the standard electronic data format for financial messages, wherein the message header includes an address for the associated payment processor;
modifying the first electronic message by appending the message header to the first electronic message; and
transmitting the modified first electronic message according to the message routing instructions included within the message header.

13. The method of claim 12, wherein the message header includes a message destination field that includes a first destination bit field, and a message source field that includes a plurality of source bit fields, and wherein generating the message header for the first electronic message further comprises:
populating the first destination bit field with the address for the associated payment processor; and
populating one of the source bit fields with a source address corresponding to the MRP computing device.

14. The method of claim 13, wherein the message destination field of the message header includes a plurality of second destination bit fields, and wherein generating the message header further comprises populating each of the plurality of second destination bit fields with a corresponding address associated with a router disposed between the MRP computing device and the associated payment processor of the first electronic message.

15. The method of claim 13, wherein generating the message header further comprises:
storing, within the one or more memory devices, a routing table;
performing a lookup within the routing table to determine appropriate bit field configurations associated with routing the first electronic message; and
populating the one of the source bit fields based upon the performed lookup.

16. The method of claim 12, wherein the message routing instructions include message routes, and wherein the method further comprises identifying a respective message route associated with each of the plurality of account identifiers.

17. A non-transitory computer-readable storage medium having computer-executable instructions embodied thereon for routing computer messages over a payment processing network, wherein when executed by one or more processors of a message routing and processing (MRP) computing device, the one or more processors in communication with one or more memory devices that store message routing instructions for each of a plurality of account identifiers, the MRP computing device being communicatively coupled to a plurality of payment processors and a plurality of financial institutions, the computer-executable instructions cause the one or more processors to:
receive, from one or more of the plurality of financial institutions, a plurality of electronic messages in a standard electronic data format for financial messages including a first electronic message, each received electronic message associated with a financial transaction initiated by an accountholder and including an account identifier, the account identifier identifying an account issued by an account issuer to the accountholder;
retrieve, from the one or more memory devices, message routing instructions for the first electronic message of the plurality of received electronic messages, the message routing instructions for the first electronic message retrieved using the account identifier included within the first electronic message; and
route the first electronic message to an associated payment processor of the plurality of payment processors based upon the retrieved message routing instructions by:
generating a message header for the first electronic message, the message header including the retrieved message routing instructions formatted using the standard electronic data format for financial messages, wherein the message header includes an address for the associated payment processor;
modifying the first electronic message by appending the message header to the first electronic message; and
transmitting the modified first electronic message according to the message routing instructions included within the message header.

18. The non-transitory computer-readable storage medium of claim 17, wherein the message header includes a message destination field that includes a first destination bit field, and a message source field that includes a plurality of source bit fields, and wherein to generate the message header, the computer-executable instructions further cause the one or more processors to:
populate the first destination bit field with the address for the associated payment processor; and
populate one of the source bit fields with a source address corresponding to the MRP computing device.

19. The non-transitory computer-readable storage medium of claim 17, wherein the message routing instructions include message routes, and wherein the computer-executable instructions further cause the one or more processors to identify a respective message route associated with each of the plurality of account identifiers.

20. The non-transitory computer-readable storage medium of claim 17, wherein the computer-executable instructions further cause the one or more processors to update, within the one or more memory devices, the message routing instructions, wherein the update is not propagated to the plurality of financial institutions.

* * * * *